United States Patent
Taylor et al.

(10) Patent No.: US 10,740,367 B2
(45) Date of Patent: Aug. 11, 2020

(54) DISPLAYING AN INDICATION OF CHANGES MADE TO CONTENT AT A SOURCE

(71) Applicant: Microsoft Technology Licensing, LLC, Redmond, WA (US)

(72) Inventors: Douglas Taylor, Kirkland, WA (US); Robyn Sambo, Redmond, WA (US); James S. Masson, Seattle, WA (US); Michael Gary Heyns, Seattle, WA (US); Victor Poznanski, Redmond, WA (US); Ruth Kikin-Gil, Seattle, WA (US); Seth Fox, Seattle, WA (US); Yibing Zhu, Woodinville, WA (US); Georges Krinker, Seattle, WA (US); Robin Emily Wakefield, Seattle, WA (US); Robert A. Little, Redmond, WA (US); Ali Taleghani, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 252 days.

(21) Appl. No.: 15/871,018

(22) Filed: Jan. 14, 2018

(65) Prior Publication Data
US 2019/0220539 A1    Jul. 18, 2019

(51) Int. Cl.
G06F 7/00    (2006.01)
G06F 16/33    (2019.01)
G06F 9/54    (2006.01)
G06F 16/93    (2019.01)
G06F 11/30    (2006.01)
G06F 11/34    (2006.01)

(52) U.S. Cl.
CPC .............. *G06F 16/33* (2019.01); *G06F 9/543* (2013.01); *G06F 11/302* (2013.01); *G06F 11/3438* (2013.01); *G06F 16/93* (2019.01)

(58) Field of Classification Search
CPC ........ G06F 16/93; G06F 9/543; G06F 11/302; G06F 16/33; H04F 11/3438
USPC .................................................. 707/600–899
See application file for complete search history.

(56) References Cited

U.S. PATENT DOCUMENTS 9,710,443 B2 * 7/2017 Srinivasan .............. G06F 16/93

OTHER PUBLICATIONS

"Refreshing data in org chart from excel spreadsheet—Microsoft Community", Retrieved From: https://answers.microsoft.com/en-us/msoffice/forum/all/refreshing-data-in-org-chartfromexcel/53df6fc5-37ef-45a6-95fd-9caee6ddda17, Jul. 11, 2016, 3 Pages.
Bajaj, Geetesh, "Insert and/or Link Pictures in PowerPoint 2011 for Mac", Retrieved From: https://www.indezine.com/products/powerpoint/learn/picturesandvisuals/insert-and-link-pictures-in-ppt-2011-mac.html, Apr. 10, 2012, 3 Pages.
(Continued)

*Primary Examiner* — Isaac M Woo

(57) ABSTRACT

Systems, methods, and software are disclosed herein for indicating a change to content in a document to a user. A document is displayed in a user interface to an application. Content then is introduced into the document from a source external to the document. After the content has been introduced into the document, the source of the content is queried for any changes to the content at the source. If a change has occurred, an indication of the change to the content at the source is introduced in the document.

18 Claims, 9 Drawing Sheets

(56) References Cited

OTHER PUBLICATIONS

Lopez, et al., "Notifications for Collaborative Documents Editing an Augmented Object Approach", In Proceedings of 8th International Conference, UCAml 2014, Belfast, UK, Dec. 2, 2014, pp. 80-87.
"International Search Report and Written Opinion Issued in PCT Application No. PCT/US19/012578", dated Apr. 2, 2019, 13 Pages.

* cited by examiner

DISPLAYING AN INDICATION OF CHANGES MADE TO CONTENT AT A SOURCE

TECHNICAL FIELD

Aspects of the disclosure are related to computing hardware and software technology, and in particular to indicate a change to content in a document from an external source.

TECHNICAL BACKGROUND

Many software applications provide users with the capability to transfer data from a location in one software application to a new location within the same or different software application. These software applications include related commands that offer user-interface techniques to duplicate data and store the duplicated data in a temporary storage location. This temporary storage location is often referred to as a clipboard and different clipboards may be used to transfer the data between locations in the software applications. Clipboards may be found in a variety of applications, including text-based applications, spreadsheet applications, presentation applications, mobile applications, web applications, database applications, and graphic design applications, and may be especially useful in the context of document drafting and formatting.

Once a user has indicated a location within the software application that the duplicated data is to be placed, the data stored in the clipboard is inserted into the position where the command was issued by the user. The command may be issued by a copy and paste command, an insert command, a drag and drop command, an import/export command, or any other command that indicates the transfer of data between locations within software applications. The data may be presented in various forms, such as text, photos, graphs, tables, spreadsheet data, audio files, video clips, among other items displayed or recorded for later use. Unfortunately, the clipboards in the software applications duplicate the data at its current state and any later modifications made to the content at the source location are not carried over to the content previously presented in destination location. Moreover, current applications do not carry over data origin information or real-time analytics information associated with the content that is gathered from the source location. This limits an ability of the application to enhance a user experience when copying data from an external location into a document.

OVERVIEW

An enhanced system, method, and software application is disclosed herein that improves displaying an indication in a document of changes made to content at the source. A document is displayed in a user interface to an application. Content then is introduced into the document from a source external to the document. After the content has been introduced into the document, the source of the content is queried for any changes to the content at the source. If a change has occurred, an indication of the change to the content at the source is introduced in the document.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DESCRIPTION

Examples of the present disclosure describe an application for displaying an indication in a document of changes made to content at the source. A document is displayed in a user interface to an application. Content then is introduced into the document from a source external to the document. After the content has been introduced into the document, the source of the content is queried for any changes to the content at the source. If a change has occurred, an indication of the change to the content at the source is introduced in the document.

A technical effect that may be appreciated from the present discussion is the increased efficiency in identifying changes made to content at the source location (e.g., determining that text previous copied and pasted has been changed) and providing a notification in the destination location that the content has been modified. The application described herein also improves the efficiency in notifying users of changes to additional information associated with the content (e.g., content analytics, content origin information, updated citation information, additional search material associated with the content, etc.).

Further, examples herein described that the content is introduced into the document from the source external to the document using a copy-and-paste command. In other examples, the content is introduced into the document from the source external to the document using an insert command. In a further example, the source of the content may be queried for any changes by querying the source for any updates to the content. In some scenarios, the content comprises a data entity linked to the source and a notification that the data entity has been changed at the source is received. The source of the content may also be queried for any changes by querying the source for interactive metadata associated with the content. The source of the content may also query the source for changes to an original version of the content from an original source external to the document and the source.

In some implementations, the source of the content may be queried for any changes by querying the source for additional content associated with the content. The source of the content may further be queried for citation information associated with the content. In further examples, in response to introducing the indication of the change to the content in the document, a user command to preview the change to the content made at the source may be received. A user command to change the content in the document corresponding to the change to the content made in the source may also be received. Further in this scenario, the content may be refreshed based on the change to the content made in the source and the user command. The content may include a portion of text, a data entity card, an image, a table, a graph, an audio file, or a video clip.

Figure 1:
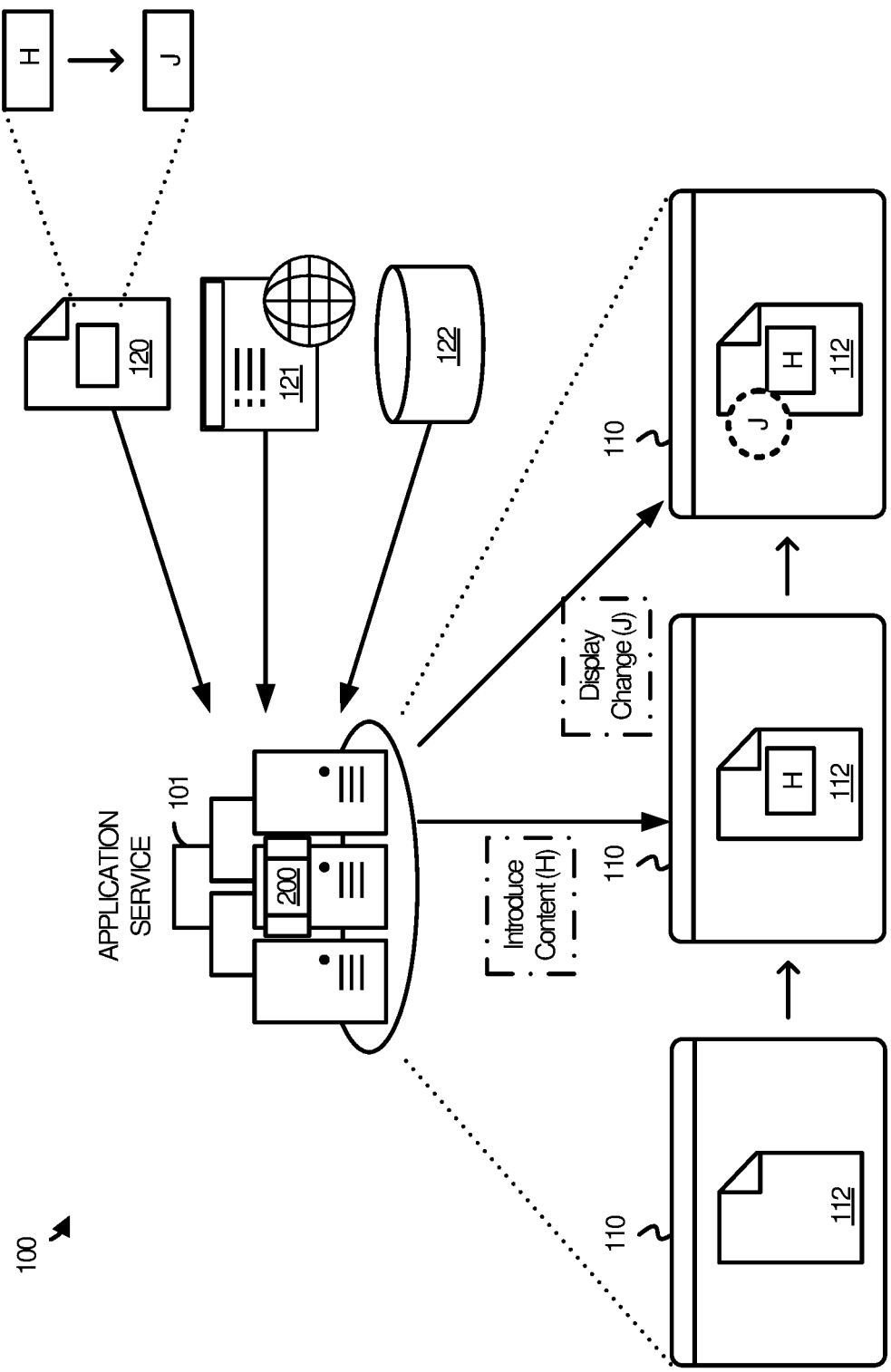
FIG. 1 illustrates an operational architecture for implementing an enhanced application to indicate a change to content in a document to a user.

Referring to the drawings, FIG. 1 illustrates an exemplary operational architecture 100 related to processing operations for management of an exemplary enhanced system with which aspects of the present disclosure may be practiced. Operational environment 100 includes application service 101. Application service 101 employs a notifying process 200 in the context of producing views in a user interface 110. User interface 110 displays content to users produced by application service 101.

Figure 9:
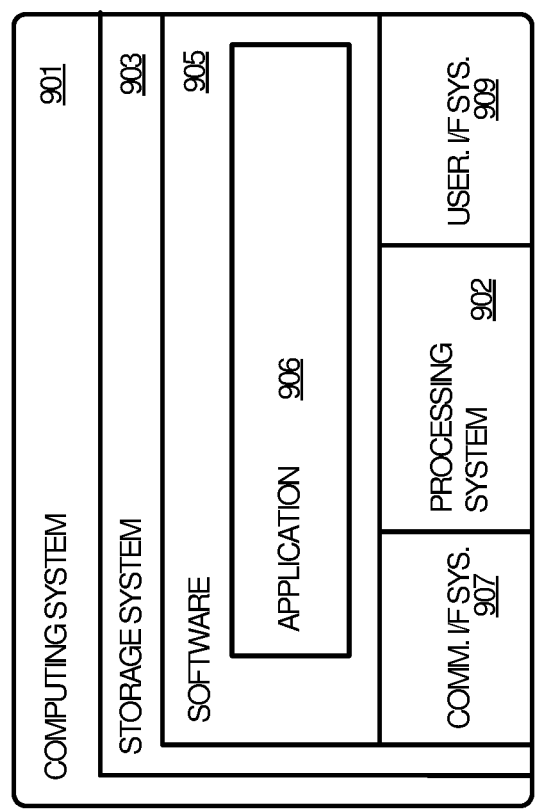
FIG. 9 illustrates a computing system suitable for implementing the technology disclosed herein, including any of the architectures, processes, operational scenarios, and operational sequences illustrated in the Figures and discussed below in the Technical Description.

Application service 101 is representative of any device capable of running an application natively or in the context of a web browser, streaming an application, or executing an application in any other manner Examples of application service 101 include, but are not limited to, personal computers, mobile phones, tablet computers, desktop computers, laptop computers, wearable computing devices, or any other form factor, including any combination of computers or variations thereof. Application service 101 may include various hardware and software elements in a supporting architecture suitable for performing notifying process 200. One such representative architecture is illustrated in FIG. 9 with respect to computing system 901.

Application service 101 also includes a software application or application component capable of indicating a change to content in a document in accordance with the processes described herein. Examples of the software application include, but are not limited to, presentation applications, diagramming applications, computer-aided design applications, productivity applications (e.g. word processors or spreadsheet applications), and any other type of combination or variation thereof. The software application may be implemented as a natively installed and executed application, a web application hosted in the context of a browser, a streamed or streaming application, a mobile application, or any variation or combination thereof.

User interface 110 includes a representative view that may be produced by a drafting and authoring application, such as Word® from Microsoft®, although the dynamics illustrated in FIG. 1 with respect to user interface 110 may apply to any other suitable application. User interface 110 may display content, such as photos, text, tables, graphs, audio files, or video clips, for example. An end user may interface with application service 101 to copy and paste content, insert content, move content, duplicate content, or any other type of content management in document 112 presented in user interface 110. It should be noted that the content is introduced into the document from a source external to document 112 (i.e., sources 120-122).

The user may interface with application service 101 over user interface 110 using an input instrument such as a stylus, mouse device, keyboard, touch gesture, as well as any other suitable input device. The user may initiate a command to introduce content into document 112, such as copy and paste, insert, drag and drop, import/export, etc. The user may also refresh content previously introduced into document 112 based on an indication of changes made to the content from sources 120-122. In an enhancement, application service 101 provides the ability to notify a user when changes have been made to content at the source in user interface 110.

Figure 2:
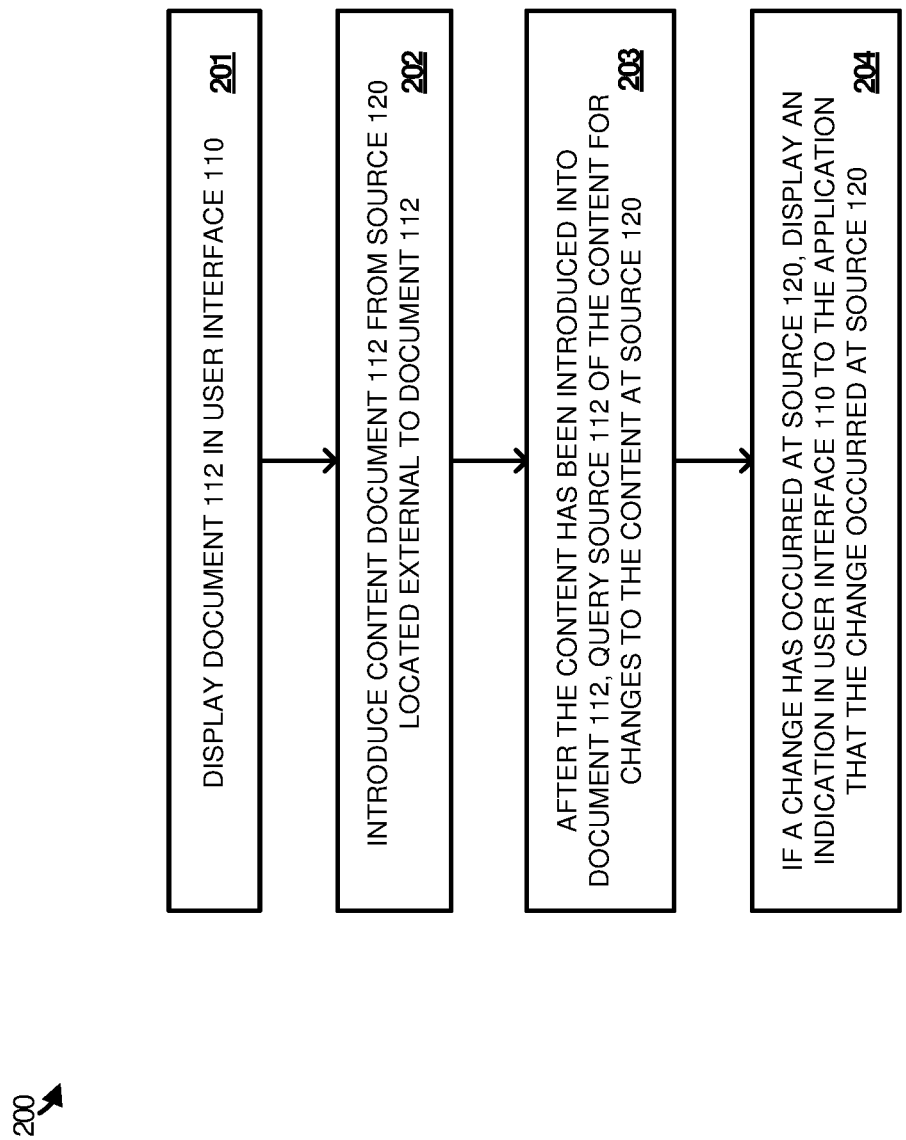
FIG. 2 illustrates a notifying process employed in implementations of an enhanced application to display an indication in a document of changes made to content at the source.

More particularly, FIG. 2 illustrates notifying process 200 which, as mentioned, may be employed by application service 101 to display an indication in a document of changes made to content at the source as described herein. Some or all of the steps of notifying process 200 may be implemented in program instructions in the context of a component or components of the application used to carry out the change indication feature. The program instructions direct application service 101 to operate as follows, referring parenthetically to the steps in FIG. 2 in the context of FIG. 1.

In operation, application service 101 displays document 112 in user interface 110. Document 112 may be a presentation, canvas or diagram, productivity document (e.g. word document or spreadsheet), and any other type of combination or variation thereof. Document 112 may be generated in application service 101 by a user. For instance, a user may create document 112 by uploading a template or generating a document from scratch including, but not limited to, electronic word documents, spreadsheets, photos, text messages, websites, media content, articles, handwritten notes written in digital ink, etc. Some exemplary applications are further configured to enable users to pull previously generated documents locally (e.g. from a storage of a specific computing device) or retrieve documents via a network connection (e.g. retrieve from a distributed storage, website, etc.).

Application service 101 then introduces content into document 112 from source 120 located external to document 112 (step 202). Application service 101 may be configured to enable users to create or edit digital documents. The users may then introduce the content into document 112 using various commands, such as a copy and paste command, an insert command, a drag and drop command, an import/export command, or any other command introducing content from external source 120. The content may be a portion of text, a data entity card, an image, a table, a graph, a data range, an audio file, a video clip, and the like.

Although not illustrated in FIG. 1, it should be noted that the data associated with the content may not be stored on a temporary storage location, such as a clipboard. Different clipboards may be used to transfer the data between locations in the software applications. Clipboards may be found in a variety of applications, including text-based applications, spreadsheet applications, presentation applications, mobile applications, web applications, database applications, and graphic design applications, and may be especially useful in the context of document drafting and formatting.

Application service 101 may insert various content into document 112. For instance, a user may introduce content by uploading or attaching content from various source documents including, but not limited to, electronic word documents, spreadsheets, photos, text messages, website links, media content, articles, notes written in digital ink, etc. Some exemplary applications are further configured to enable users to pull content locally (e.g. from a storage of a specific computing device) or retrieve content via a network connection (e.g. retrieve content from a distributed storage, website, etc.). In some examples, application service 101 may insert a data entity card from source 120. Application service 101 may also create a data entity card in document 112 comprising the content from source 120. In either scenario, the data entity card in document 112 may be linked to source 120 (e.g., a data entity card located in source 120).

Application service 101 may receive user input indicative of the command to introduce the content by receiving user input in user interface 110. Application service 101 may then store the indicated content onto a native or cloud-based clipboard in the software application based on the received user input. Application service 101 may receive the user input using an input instrument such as a stylus, mouse device, keyboard, touch gesture, as well as any other suitable input device.

In a next operation, after the content has been introduced into document 112, application service 101 queries source 120 for any changes to the content at source 120 (step 203). Application service 101 may also allocate the content as live or static. If the content is allocated as live, the content may be tracked in document 112 for changes at source 120. If the content is allocated as static, the content will not be tracked in document 112 for changes at source 120. It should be noted that application service 101 may also allocate the content as live for certain changes at source 120, but as static for other changes at source 120. For example, content in the form of an imported video clip in document 112 may be live to track for changes to the video clip itself at source 120, such as edits to the video clip. However, application service 101 may allocate interactive metadata associated with the video clip as static where user interactions with the clip, such as changes to a number of shares and likes, are not tracked at source 120.

The change to the content may be an update to the content, such as edits made to a section of text included in the content at the source that was previously introduced into document 112. The change may be a change to interactive metadata associated with the content. For example, source 120 may be queried for a change in a number of content shares to other documents, a number of user likes, or a number of views by a user. The change may alternatively be a change made to an original version of the content from an original source external to the document and the source. For example, source 120 may have received content from original source 121. When the change to the source has been detected in original source 121, the change will be determined by application service 101. In some implementations, source 120 of the content may be queried for additional content associated with the content, such as an updated list of additional search materials. The update may be triggered by the author of the content previously introduced into document 112 publishing additional content, or source 120 adding related content to the content previously introduced into document 112. The source of the content may further be queried for updated citation information associated with the content.

Application service 101 may query source 120 for any changes to the content at source 120 by periodically returning to source 120 and retrieving the latest version of the content in source 120. Application service 101 may also query source 120 when an action is made in document 112, such as when document 112 is saved, re-opened, shared, emailed, re-located in a storage system, opened by another user or on another device, etc. Source 120 may also be queried when instructed by a user, such as by a user command to update content introduced into document 112 by source 120. In other scenarios, application service 101 may query source 120 only when an action is performed on the content itself in document 112. For example, application service 101 may query source 120 for changes to the content in source 120 when the content is shared, re-copied, re-located in document 112, reformatted, etc.

In other implementations, application service 101 may query source 120 for changes to the content at source 120 based on a received notification that the content has been changed at source 120. Application service 101 may receive the notification when the content is in the form of a data entity card which is linked to source 120 or another data entity card associated with source 120. For example, application service 101 may have inserted a data entity card into document 112 which is linked to an original data entity card located in source 120. Application service 101 may then receive an alert that the original data entity card located source 120 has been changed. In other scenarios, application service 101 may receive the notification that the content has been changed at source 120 from a content search system, such as an Internet bot than search for updated web content (e.g., web crawler). The content search system may be used and maintained by application service 101. However, in other implementations, application service 101 may receive a notification from an intermediary content search system which application service 101 has subscribed to for updates on the content at source 120.

Application service 101 may determine that the content has been changed using various techniques. One technique may require application service 101 to directly compare the changed content to the original content previously presented in document 112. For example, application service 101 may search the location of where the content was previously copied from and pull the latest version of the text. Application service 101 may then compare the words of the text to determine if the content has been updated or changed from the version that was previously copied in source 120. In other scenarios, application service 101 may compare the entire content at source 120 for changes. For example, application service 101 may compare all of the data in a data file to determine if the latest version of the data file matches the data file previously imported into document 112.

Alternatively, application service 101 may query source 120 for a modification time stamp and compare the latest modification time stamp to the modification time stamp associated with the content previously introduced into document 112. In this scenario, application service 101 may then alert the user that the content has been changed since the last time the content has been copied and pasted based on the modification time. However, application service 101 may further query source 120 for the latest version of the content and compare the content to the previous version of the content.

In a final operation, if a change has occurred at source 120, application service 101 displays an indication in user interface 110 to the application that the change occurred at source 120. Application service 101 may display the indication as an icon, a toolbar indicator, a typographical variation (e.g., highlighting, shading, bolding, underlining, size enlargement or reduction), an animation, or any other technique to alert a user to the change in content. The indication may also be displayed in the form of a card or an activity indicator and may additionally display an explanation of the activity performed on the content at source 120 and/or a preview of the change which was made at source 120. In some scenarios, the display of the indication may be toggled on or off depending on a user command or user preference setting.

Application service 101 may further display an indication of the change that occurred at source 120 in the form of a notification message. The notification message may be displayed to the user in document 112, in an email message, text message, user sharing and collaboration application, an internet instant message application, or any other notification message service. For example, users drafting a document in a shared document editing application may be alerted of a change to a data entity card from source 120 in the form of an indication on the data entity card in document 112 and in the form of a ping message in the application (e.g., if some users do not have the data entity card in view while editing document 112). Further, users not currently viewing document 112 may receive a notification message in the form of an email or text message indicating the content in document 112 has been changed at source 120.

In some examples, in response to displaying the indication in document 112 of the change to the content made at source 120, application service 101 receives a user command over user interface 110 to preview the change to the content in document 112. It should be noted that a preview of the change to the content in document 112 may also be displayed automatically without an instruction from a user. In other examples, application service 101 may receive a user command over user interface 110 to change the content in document 112 corresponding to the change to the content made in source 120. For example, an indicator of the change may be displayed on user interface 110 to a user indicating an update made to citation information. In response, application service 101 may receive a user command over user interface 110 instructing application service 101 to refresh the citation information previously introduced in document 112.

Figure 3:
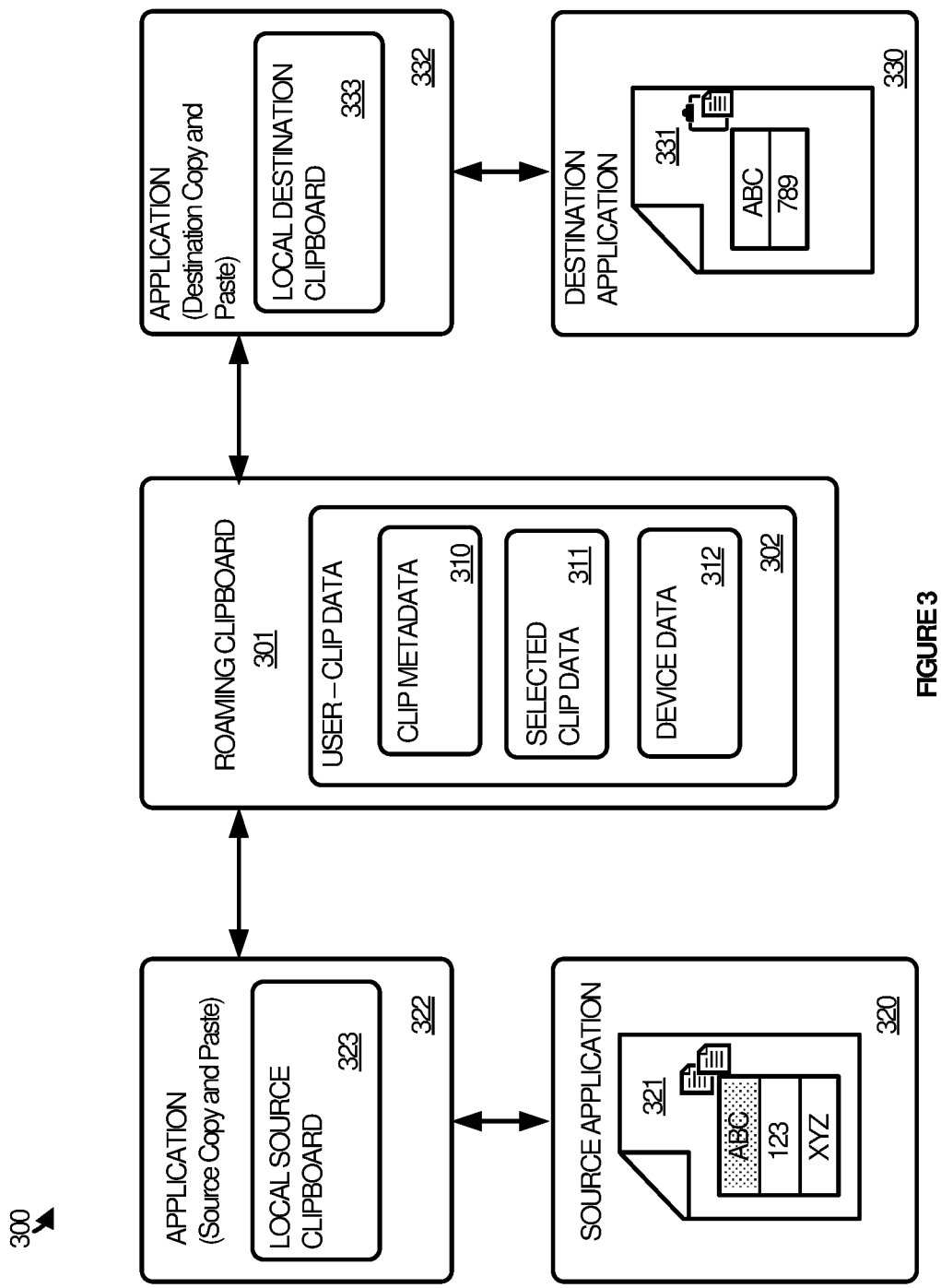
FIG. 3 illustrates an operational scenario in an implementation of an enhanced application to display an indication in a document of changes made to content at the source.

FIG. 3 illustrates a set of components 300 that may be used according to one or more implementations of the present technology. According to the scenario shown in FIG. 3, the system includes source copy/paste application 322 on a first device with access to local clipboard 323, roaming clipboard 301, destination copy/paste application 332 on a second device with access to local destination clipboard 333, and one or more productivity applications 320 and 330. In accordance with various implementations, a user may use source copy/paste application 322 or destination copy/paste application 332 to copy material (e.g., data, pictures, data entity cards, images, code, text, files, etc.) from productivity application 320 or 330 to the other using roaming clipboard 301.

Although FIG. 3 illustrates that source copy/paste application 322 and destination copy/paste application 332 share copied material over roaming clipboard 301, it should be understood that source copy/paste application 322 and destination copy/paste application 332 may share copied material directly using either the local source clipboard 323, the local destination clipboard 333, or both.

Each of these applications or modules may be part of operating system utilities, cloud-based platforms (e.g., accessed via a webpage or other portal), productivity applications, a feature of a larger application like a spreadsheet or word processing application, and the like.

In one implementation, a class library provides two classes, the data source objects to represent the source side of the data transfer (e.g., from source copy/paste application 322 to roaming clipboard 301) and data destination objects to represent the destination side of the data transfer (e.g., from roaming clipboard 301 to destination copy/paste application 332). These local copy/paste services can be extended to reach into the temporary cloud hosted roaming clipboard 301.

In some examples, the roaming clipboard can be a proxy that connects the client copy objects and buffers with the destination paste operation. These classes can be extended to support remote interfaces. Other implementations of the present technology may include some, all, or none of these modules and components along with other modules, applications, and/or components. Still yet, some scenarios may incorporate two or more of these modules, applications, and components into a single module or application and/or associate a portion of the functionality of one or more of these modules with a different module or application. For example, source copy/paste application 322, roaming clipboard 301, and destination paste/paste application 332 can be combined into a single copy/paste application hosted on a cloud-based server.

Source copy/paste application 322 can store the copied data on roaming clipboard 301 and optionally specify access control information that limits the client devices, user, groups of users, or applications that can paste the data. Destination copy/paste application 332 may then use cloud enabled interfaces that include access credentials such as the users access tokens, device credentials, etc. to retrieve the information in the format appropriate for the paste operation.

In some implementations, roaming clipboard 301 can be implemented as an application interface to 322 and 332 that sits on top of an email account or messaging service. As a result, a copy operation can paste a message to the text or email message. Similarly, the paste operation can transparently retrieve the content from the message and paste the content when requested by the user. In some examples, the messages copied and pasted to the email or messaging applications include metadata such as the collaboration document Uniform Resource Locator (URL) and collaborators so that the pasting application at the receiving end can find and filter the received copied buffers to a relevant list for a user editing different documents.

A user can select data from table 321 in productivity application 320. Upon requesting the data be copied, source copy/paste application 322 identifies the user selected data and copies the data into one or more clipboards. In some scenarios, the user may select either a local source clipboard 323 or roaming clipboard 301. Copy requests may copy the material into local source clipboard 323 which is then mirrored on roaming clipboard 301 (e.g., in response to one or more events such as, but not limited to, a save command, a periodic schedule, request from roaming clipboard, etc.). Roaming clipboard 301 can store a variety of data types, such as, but not limited to text strings, data structures, text and binary stream data, and even application assets.

Roaming clipboard 301 can store multiple copies of clipboard data in individually enumerated buffers associated with a user, file, or other distinguishing structure with descriptors for the data. Roaming clipboard 301 can copy the data to the buffers on the copy command in various formats filling the appropriate buffer, or be deferred and simply keep track of the data marked for copy which is then performed when the data is pasted to a destination and the destination application requests the buffer or buffers from the application performing the copy operation. Roaming clipboard 301 can be implemented by a cloud-based service that will provide access to the data buffers to multiple devices. In accordance with various scenarios, source copy/paste application 322, roaming clipboard 301, and/or destination copy/paste application 332 may be implemented in a variety of ways including, but not limited to, java script (e.g. as a plug in to a browser or productivity suite), web-based, operating system utilities, application features, etc.

Source copy/paste application 322, destination copy/paste application 332, and roaming clipboard 301 may store the data in different ways depending on the data type. In some implementations, the data may be split into different portions for complex data. For example, simple text data can be stored directly in roaming clipboard 301, while more complex data can be stored using references that copy/paste application 332 can resolve and use to reconstruct the data in a desired format. Clip data 302 includes metadata 310, selected clip data 311, and device or user data 312. Clip data 302 can include parameters such as access control lists, user access lists, device access permissions, and the like to ensure only authorized users can access the clipboard data during the copy and paste scenario from start to finish. Using this type of organization, destination copy/paste application 332 can access parts of the data that are needed based on the originating device (or user, etc.) and reconstruct the data for pasting, possibly in alternate formats as requested by a user. For example, destination copy/paste application 332 may paste just the clip data, paste the selected data in the table format, etc.

In some implementations, the roaming clipboard data 302 can be deleted after the user closes application 320. Data 302 may be deleted when the user logs out of all systems, or deleted when the user pastes the data into application 330. Some scenarios the data is deleted after a timer times out or the user is asked if they want to keep the buffer when they exit an application. When the user chooses yes, data 302 can be preserved for a longer timeout such as twenty-four hours, a week, or some other period of time. The value can be configured by a system administrator or can even be a user configurable setting by the copy and/or paste client.

Figure 4:
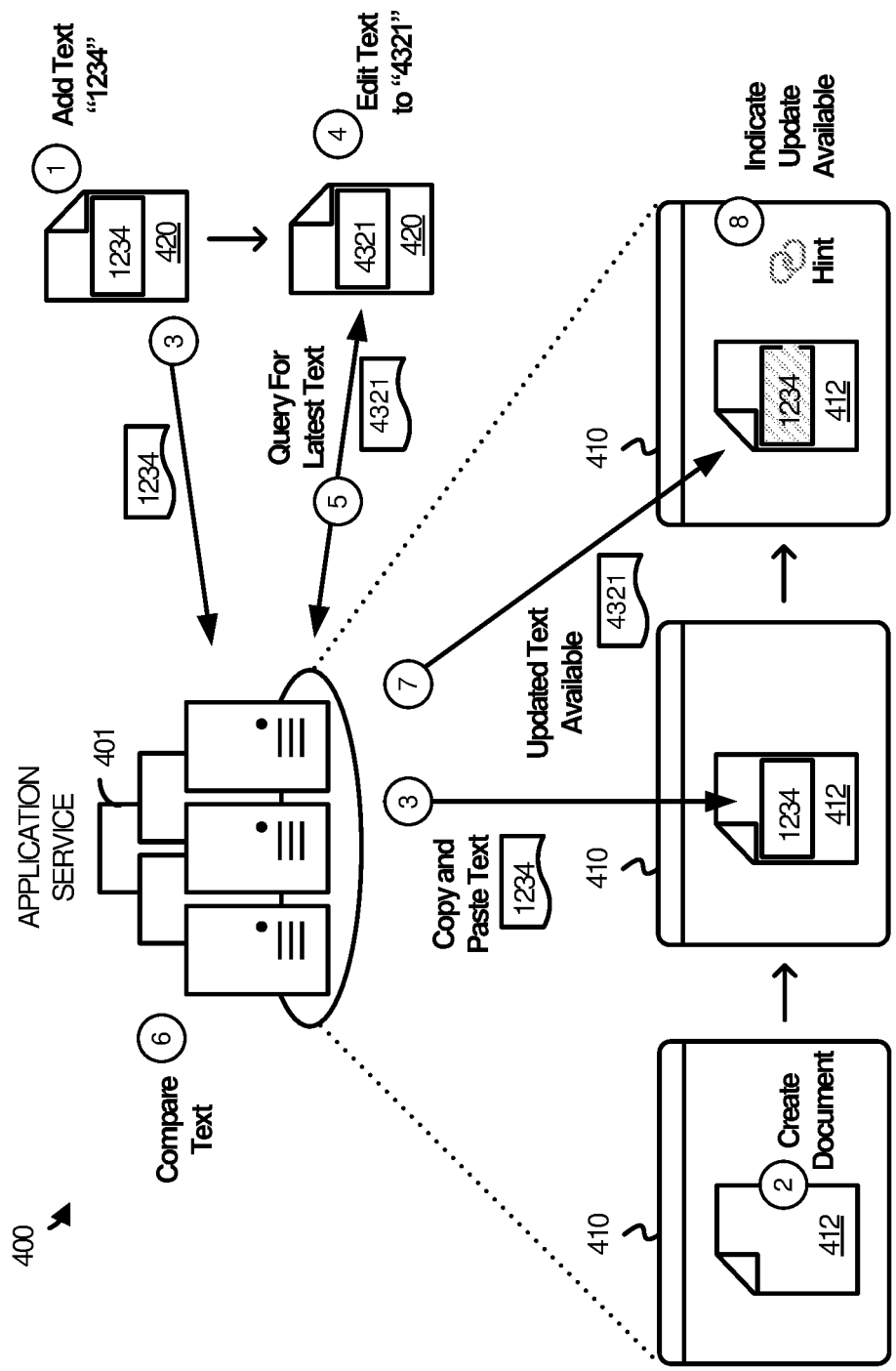
FIG. 4 illustrates an alternative operational architecture in an implementation of an enhanced application to indicate a change to content in a document to a user.

FIG. 4 illustrates an exemplary operational architecture for displaying an indication in a document of a change made at the source that may be used in one or more scenarios of the present technology. FIG. 4 illustrates an operational scenario 400 that relates to what occurs when text is edited at a source and a user desires to be alerted of the change. Operational scenario 400 includes application service 401, user interface 410, and source 420. User interface 410 displays text document 412.

In a first operation, text is written to source 420 (e.g., "1234"). The text may be added by a source user in a local environment or in a cloud-based environment. The text is then accessible to be viewed by other users. For example, the user may post the text into a document sharing environment which may be accessed by users via application service 401.

In a next operation, text document 412 is created by a destination user and displayed in user interface 410. In this scenario, the text previously added to source 420 is copied and pasted into text document 412 and displayed to the user.

In a fourth operation, the original text (e.g., "1234") is edited in the source (e.g.; "4321"). At a later point, such as after an internal timer featured in application service 401 has expired, application service 401 queries source 420 for the original text. In this example scenario, application service 401 may search in the location where the original text was written and retrieve the chunk of text located in the location of the previously copied and pasted text (e.g., text from a numbered page, a number paragraph, a numbered slide in a presentation, a webpage location on a website, etc.). However, in other scenarios, application service 401 may retrieve all of the text in the file containing the copied and pasted text and compare the text to determine whether the previously copied and pasted text has changed.

Referring still to the scenario illustrated in FIG. 4, application service 401 retrieves the latest text from the location and compares it to the previously copied and pasted text. Application service 401 may compare the latest version of the text saved on a local clipboard for text document 412, a local clipboard for application service 401, or the text as currently written into text document 412 (e.g., a flag may be associated with the original copied and pasted text).

Once application service 401 compares the copied and pasted text with the latest version of the text from source 420, application service 401 determines that the text has been updated at the source. Therefore, in a seventh operation, an alert that text has been updated and is available is transferred to user interface 410. In a final operation, user interface 410 displays the alert on text document 412. In this scenario, the alert be in the form of a highlighting on the content in document 412 and include a hint icon, but not include the updated text itself. The highlighting on the content indicates that an update has been made in source 420 to the text and is available to be retrieved at the user's command by selecting the hint icon.

Figure 5:
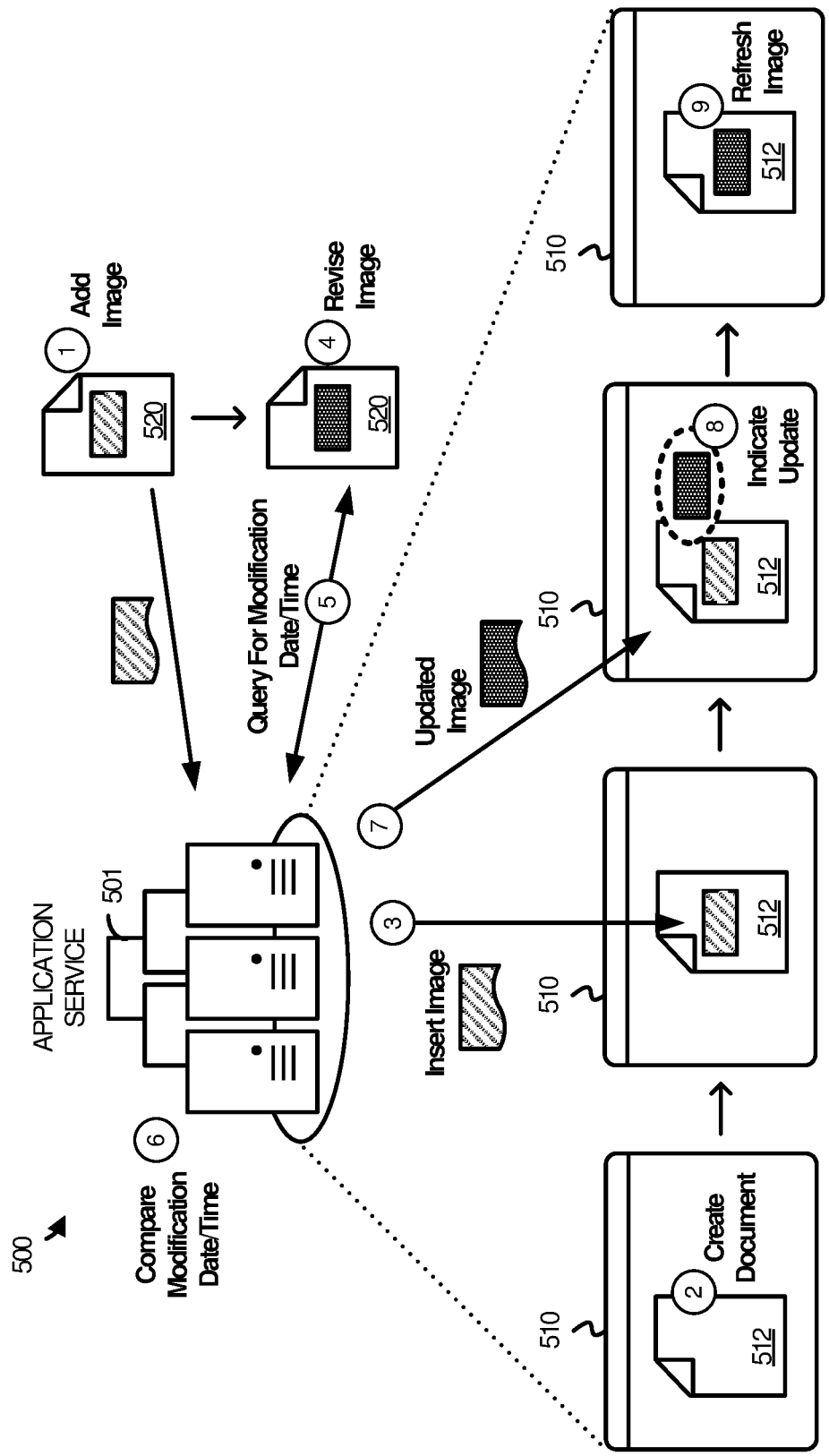
FIG. 5 illustrates an alternative operational architecture in an implementation of an enhanced application to indicate a change to content in a document to a user.

FIG. 5 illustrates an exemplary operational architecture for displaying an indication in a document of a change made at the source that may be used in one or more scenarios of the present technology. FIG. 5 illustrates an operational scenario 500 that relates to what occurs when an image is modified and a user desires to refresh an existing image with a modified version of the image. Operational scenario 500 includes application service 501, user interface 510, and source 520. User interface 510 displays presentation document 512.

In a first operation, an image is created in source 520. The image may be created by a source user in a local environment or in a cloud-based environment. The image is then accessible to be viewed by other users. For example, the user may post the image on a publicly accessible webpage which may be viewed by users via application service 501. In a next operation, presentation document 512 is created by a destination user and displayed in user interface 510. In this scenario, the image previously added to source 520 is inserted into presentation document 512 and displayed to the user.

In a fourth operation, the original image is revised in the source. At a later point, such as upon reopening presentation document 512, application service 501 queries source 520 for the last modification date and time. In this example scenario, application service 501 may determine that the image itself has been revised or replaced at a specific date and time. However, in other scenarios, application service

501 may only determine that source 520 has been modified or updated at a date and time. In either scenario, application service 501 may determine that source 520 and/or the previously inserted image have been modified since the image was originally inserted.

Referring still to the scenario illustrated in FIG. 5, application service 501 compares the modification date and time of the original date and time. Application service 501 may compare the date and time associated with the date and time stored with a local clipboard for presentation document 512, a local clipboard for application service 501, or associated with the image as currently stored on presentation document 512 (e.g., metadata associated with the original inserted image).

Once application service 501 compares the original date and time associated with the image against the latest date and time of the image from source 520, application service 501 determines that the image has been updated at the source. Therefore, in a seventh operation, the update image is retrieved from source 520 and transferred to user interface 510. In an eighth operation, an indication that the image has been revised and is available is displayed in user interface 510. In this scenario, the indication may include a preview of the revised image in the indication. In a final operation, user interface 510 receives a user input indicating that the original image should be replaced by the revised image. Application service 501 then refreshes the image and displays the image on presentation document 512.

Figure 6:
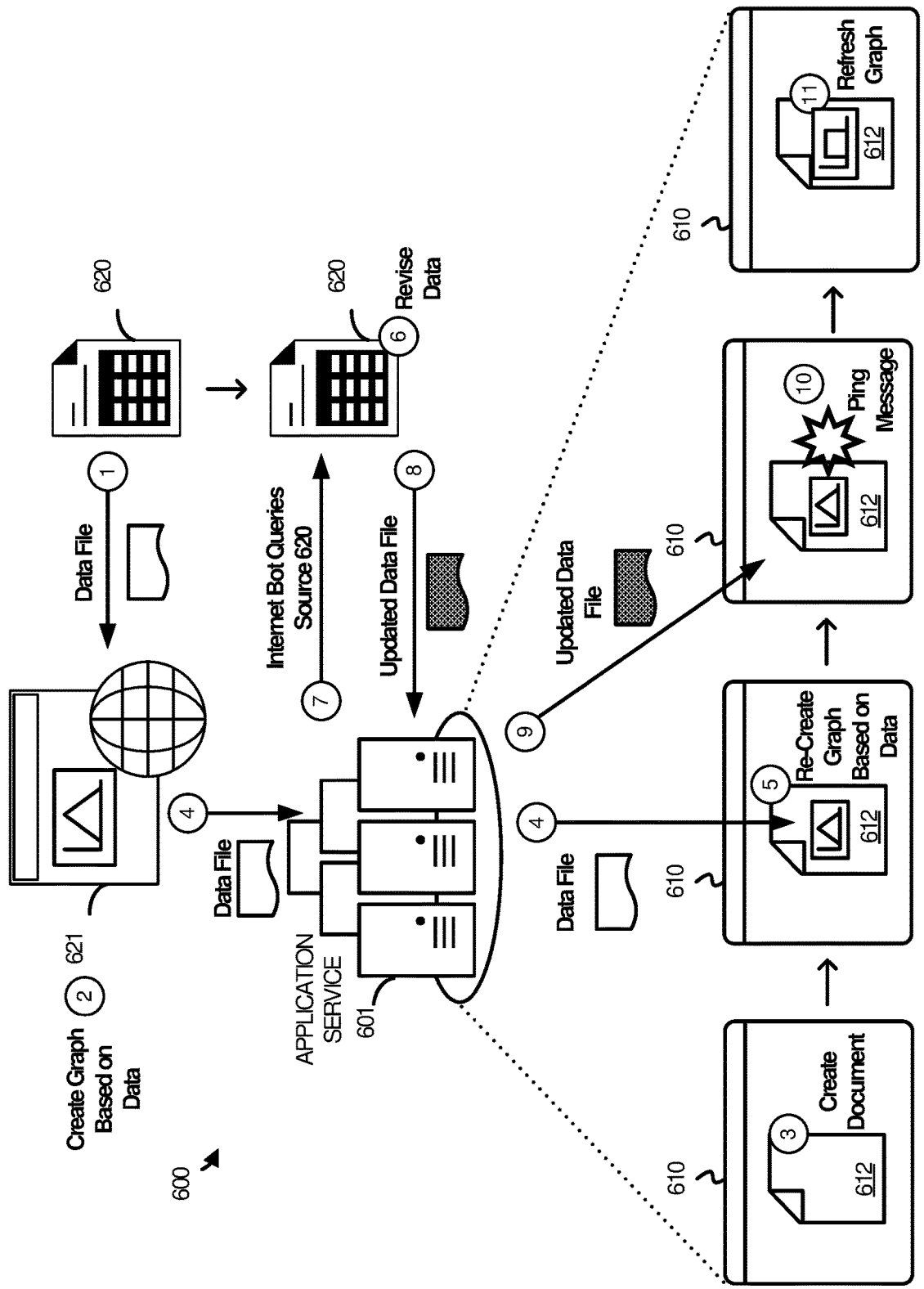
FIG. 6 illustrates an alternative operational architecture in an implementation of an enhanced application to indicate a change to content in a document to a user.

FIG. 6 illustrates an exemplary operational architecture for displaying an indication in a document of a change made at the source that may be used in one or more scenarios of the present technology. FIG. 6 illustrates an operational scenario 600 that relates to what occurs when a data in a data file is updated and a user desires to refresh an existing graph based on the spreadsheet data in the data file. Operational scenario 600 includes application service 601, user interface 610, intermediary source 621, and original source 620. User interface 610 displays graphical document 612.

In a first operation, data is entered into a data file in original source 620. The data file is then used imported by intermediary source 621 which uses the data in the data file to generate and display a graph illustrating the data in the data file. In this scenario, the data file is created by a source user in original source 620 and the graph is created by a source user in intermediary source 621. It should be noted that both the graph and the underlying spreadsheet data are accessible to other users. For example, the intermediary source user may post the graph along with a link to original source 620 hosting the data file on a publicly accessible webpage which may be viewed by users via application service 601.

In a next operation, graphical document 612 is created by a destination user and displayed in user interface 610. In this scenario, the graph previously created by intermediary source 621 not imported but the data file created by original source 620 is imported into graphical document 612 and displayed to the end user. In a fifth operation, the end user re-creates the graph in graphical document 612 based on the imported data file.

In a sixth operation, the data from the original data file is revised in source 620. Application service 601 includes either an intermediary internet bot or an internet bot included in application service 601 to determined that the data file has been revised in original source 620 and query original source 620 for the revised version of the data file. In this example scenario, application service 601 may determine that the data specifically used to re-create the graph has been updated in the updated data file. However, in other scenarios, application service 601 may only determine that some of the data from original source 620 has been modified or updated but not necessarily the data used to re-create the graph.

Referring still to the scenario illustrated in FIG. 6, in an eighth operation, application service 601 retrieves the modified data file directly from original source 620 and compares the original data used to re-create the graph with the corresponding data in the modified data file. Once application service 601 has compared the data from the original data file and the data from the modified data file, application service 601 determines that the data used to re-create the graph has been updated at original source 620. Therefore, in a ninth operation, the updated data file is transferred to user interface 610. In a tenth operation, an indication that the data used to re-create the graph has been revised and is available is displayed in user interface 610. In this scenario, the indication is displayed in the form of a ping message in user interface 610. In a final operation, user interface 610 receives a user input indicating that the graph displayed in graphical document 612 should be refreshed with the updated data. Application service 601 then re-creates the graph and displays the graph on graphical document 612.

Figure 7:
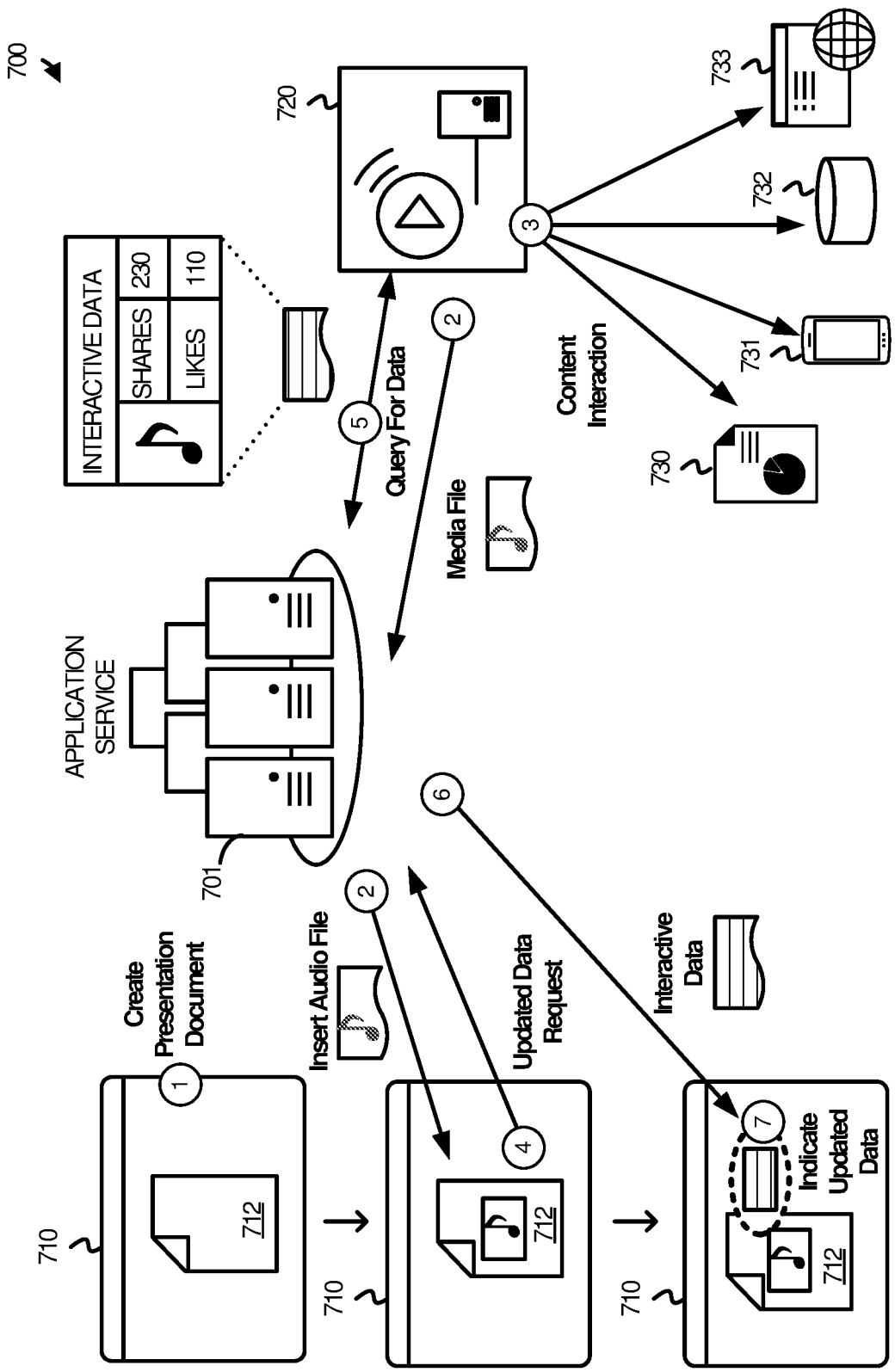
FIG. 7 illustrates an alternative operational architecture in an implementation of an enhanced application to indicate a change to content in a document to a user.

FIG. 7 illustrates an exemplary operational architecture for displaying an indication in a document of a change made at the source that may be used in one or more scenarios of the present technology. FIG. 7 illustrates an operational scenario 700 that relates to what occurs when interactive metadata associated with content is updated and a user desires to view the updated interactive metadata about the content. Operational scenario 700 includes application service 701, user interface 710, source 720, and devices 730-733. User interface 710 displays media document 712.

In a first operation, presentation document 712 is created and displayed on user interface 710. In a next operation, application service 701 inserts an audio file into presentation document 712. In this scenario, the audio file is originated in source 720. For example, a user may insert a sound clip from a publicly accessible webpage which may be viewed by multiple users via application service 701. As can be seen in the third operation that source 720 shares the audio file with multiple destinations 730-733. A user viewing presentation document 712 and listening to the audio file may want to determine interaction data from other users, such as a number of shares or likes. Therefore, application service 701 receives a user request for interaction data associated with the audio file. In a fifth operation, application service 701 queries source 720 for updated interactive metadata associated with the audio file. In this example scenario, application service 701 may compare the interactive metadata originally received with the audio file and determine that the interactive metadata associated with the audio file has been updated. For example, the number of shares associated with the audio file may have increased from 180 shares to 230 shares. Once application service 701 has determined that the interactive metadata associated with the audio file has changed, application service 701 may transfer the updated interactive metadata to user interface 710. In a seventh operation, an indication of the updated interactive metadata is displayed in presentation document 712 in user interface 710.

Figure 8:
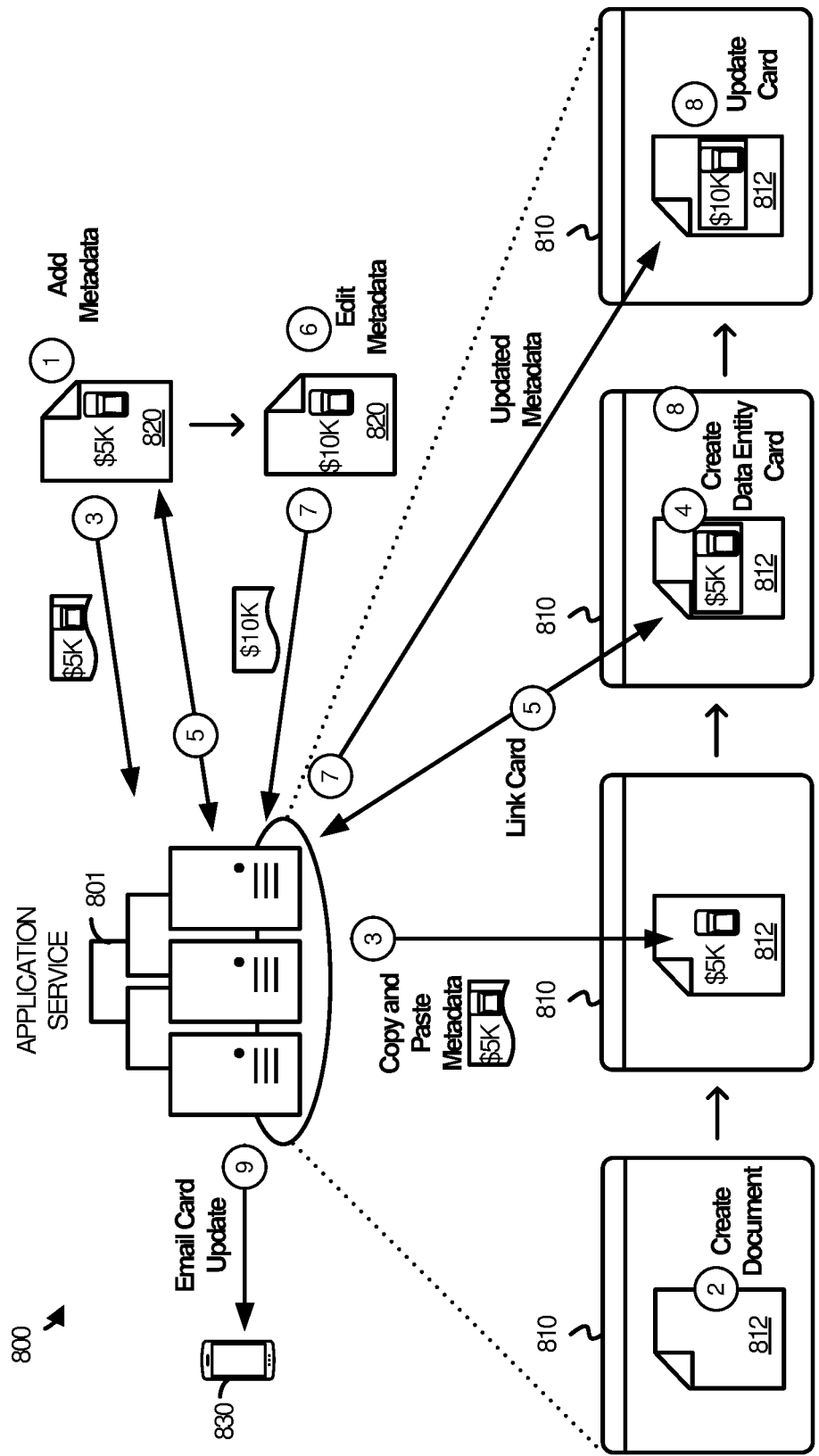
FIG. 8 illustrates an alternative operational architecture in an implementation of an enhanced application to indicate a change to content in a document to a user.

FIG. 8 illustrates an exemplary operational architecture for displaying an indication in a document of a change made at the source that may be used in one or more scenarios of the present technology. FIG. 8 illustrates an operational scenario 800 that relates to what occurs when a data entity card is created in a document which is linked to content from a source. Operational scenario 800 includes application service 801, user interface 810, source 820, and user device 830. User interface 810 displays collaboration document 812.

First, metadata is created in source 820. In this scenario, the metadata includes an image of a car and a price of $5,000. In a second operation, collaboration document 812 is created and displayed on user interface 810. In a next operation, application service 801 copies and pastes the metadata (image and price) into collaboration document 812. As can be seen in the fourth operation, application service 801 creates a data entity card including the copy and pasted metadata. In response to creating the data entity card, application service 801 links the data entity card with the metadata in source 820.

In a sixth operation, the metadata is edited in source 820. For example, the price is modified from $5,000 to $10,000. Since the metadata in source 820 has been previously linked to the data entity card in document 812, application service 801 is signaled of the change to the metadata, receives the updated metadata from source 820, and transfers the updated metadata to be displayed in document 812. In an eighth operation, the data entity card in document 812 is automatically updated with the updated metadata and displayed in user interface 810. In a final operation, an email notification indicating that the data entity card has been updated is transferred to a user over user device 830.

FIG. 9 illustrates computing system 901, which is representative of any system or visual representation of systems in which the various applications, services, scenarios, and processes disclosed herein may be implemented. Examples of computing system 901 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 901 may be implemented as a single apparatus, system, or device or may be implemented in a distributed manner as multiple apparatuses, systems, or devices. Computing system 901 includes, but is not limited to, processing system 902, storage system 903, software 905, communication interface system 907, and user interface system 909. Processing system 902 is operatively coupled with storage system 903, communication interface system 907, and user interface system 909.

Processing system 902 loads and executes software 905 from storage system 903. Software 905 includes process 906, which is representative of the processes discussed with respect to the preceding FIGS. 1-8, including notifying process 200. When executed by processing system 902 to enhance an application, software 905 directs processing system 902 to operate as described herein for at least the various processes, operational scenarios, and sequences discussed in the foregoing implementations. Computing system 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device, but may also be distributed across multiple processing devices or sub-systems that cooperate in executing program instructions. Examples of processing system 902 include general purpose central processing units, graphical processing unites, application specific processors, and logic devices, as well as any other type of processing device, combination, or variation.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. Storage system 903 may be implemented as a single storage device, but may also be implemented across multiple storage devices or sub-systems co-located or distributed relative to each other. Storage system 903 may comprise additional elements, such as a controller, capable of communicating with processing system 902 or possibly other systems.

Software 905 may be implemented in program instructions and among other functions may, when executed by processing system 902, direct processing system 902 to operate as described with respect to the various operational scenarios, sequences, and processes illustrated herein. Software 905 may include program instructions for implementing notifying process 200.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software, virtual machine software, or other application software, in addition to or that include process 906. Software 905 may also comprise firmware or some other form of machine-readable processing instructions executable by processing system 902.

In general, software 905 may, when loaded into processing system 902 and executed, transform a suitable apparatus, system, or device (of which computing system 901 is representative) overall from a general-purpose computing system into a special-purpose computing system to enhance canvas service for graphically organizing content in a user interface. Indeed, encoding software 905 on storage system 903 may transform the physical structure of storage system 903. The specific transformation of the physical structure may depend on various factors in different implementations of this description. Such factors may include, but are not limited to, the technology used to implement the storage media of storage system 903 and whether the computer-storage media are characterized as primary or secondary storage, as well as other factors.

If the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 909 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here. User interface system 909 may also include associated user interface software executable by processing system 902 in support of the various user input and output devices discussed above.

Communication between computing system 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here.

In any of the aforementioned examples in which data, content, or any other type of information is exchanged, the exchange of information may occur in accordance with any of a variety of protocols, including FTP (file transfer protocol), HTTP (hypertext transfer protocol), HTTPS, REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Certain inventive aspects may be appreciated from the foregoing disclosure, of which the following are various examples.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. Those skilled in the art will understand and appreciate that a method could alternatively be represented as a series of interrelated states or events, such as in a state diagram. Moreover, not all acts illustrated in a methodology may be required for a novel implementation.

What is claimed is:

1. A computer apparatus comprising:
   one or more computer readable storage media;
   a processing system operatively coupled to the one or more computer readable storage media; and
   program instructions stored on the one or more computer readable storage media that, when executed by the processing system, direct the processing system to at least:
   display a document in a user interface to an application;
   introduce content into the document from a source external to the document, wherein the content comprises a data entity linked to the source;
   after the content has been introduced into the document, receive a notification that the data entity has been changed at the source;
   in response to receiving the notification, query the source of the content for changes to the content at the source; and
   if a change has occurred at the source, display an indication in the user interface to the application that the change occurred at the source.

2. The computer apparatus of claim 1 wherein the content at the source is introduced into the document from the source external to the document using at least one of a copy-and-paste command or an insert command.

3. The computer apparatus of claim 1 wherein to query the source of the content for any changes to the content at the source comprises the processing system configured to query the source for an update to the content at the source.

4. The computer apparatus of claim 1 wherein to query the source of the content for any changes to the content at the source comprises the processing system configured to query the source for interactive metadata associated with content.

5. The computer apparatus of claim 1 wherein to query the source of the content for any changes to the content at the source comprises the processing system configured to query the source for changes to an original version of the content from an additional source external to the document and the source.

6. The computer apparatus of claim 1 wherein to query the source of the content for any changes to the content at the source comprises the processing system configured to query the source for additional content associated with the content.

7. The computer apparatus of claim 1 wherein, in response to introducing the indication of the change to the content in the document, the processing system is further configured to receive a user command to at least display a preview of the change to the content at the source or change the content in the document corresponding to the change to the content made in the source.

8. The computer apparatus of claim 1 wherein the content at the source comprises at least one of portion of text, a data entity card, an image, a table, a graph, an audio file, or a video clip.

9. A method comprising:
displaying a document in a user interface to an application;
introducing content into the document from a source external to the document, wherein the content comprises a data entity linked to the source;
after the content has been introduced into the document, receiving a notification that the data entity has been changed at the source;
in response to receiving the notification, querying the source of the content for changes to the content at the source; and
if a change has occurred at the source, displaying an indication in the user interface to the application that the change occurred at the source.

10. The method of claim 9 wherein the content at the source is introduced into the document from the source external to the document using at least one of a copy-and-paste command or an insert command.

11. The method of claim 9 wherein querying the source of the content for any changes to the content at the source comprises querying the source for an update to the content at the source.

12. The method of claim 9 wherein querying the source of the content for any changes to the content at the source comprises querying the source for interactive metadata associated with content.

13. The method of claim 9 wherein querying the source of the content for any changes to the content at the source comprises querying the source for changes to an original version of the content from an additional source external to the document and the source.

14. The method of claim 9 wherein querying the source of the content for any changes to the content at the source comprises querying the source for additional content associated with the content.

15. The method of claim 9 wherein, in response to introducing the indication of the change to the content in the document, receiving a user command to at least display a preview of the change to the content at the source or change the content in the document corresponding to the change to the content made in the source.

16. The method of claim 9 wherein the content at the source comprises at least one of portion of text, a data entity card, an image, a table, a graph, an audio file, or a video clip.

17. One or more computer readable storage media having program instructions stored thereon, wherein the program instructions, when executed by a processing system, direct the processing system to at least:
display a document in a user interface to an application;
introduce content into the document from a source external to the document, wherein the content comprises a data entity linked to the source;
after the content has been introduced into the document, receive a notification that the data entity has been changed at the source;
in response to receiving the notification, query the source of the content for changes to the content at the source; and
if a change has occurred at the source, display an indication in the user interface to the application that the change occurred at the source.

18. The one or more computer readable storage media of claim 17 wherein the content at the source is introduced into the document from the source external to the document using at least one of a copy-and-paste command or an insert command.

* * * * *